Nov. 24, 1925.
R. CRAIG
1,563,019
DAMPING DEVICE FOR SCALES
Filed Feb. 19, 1921
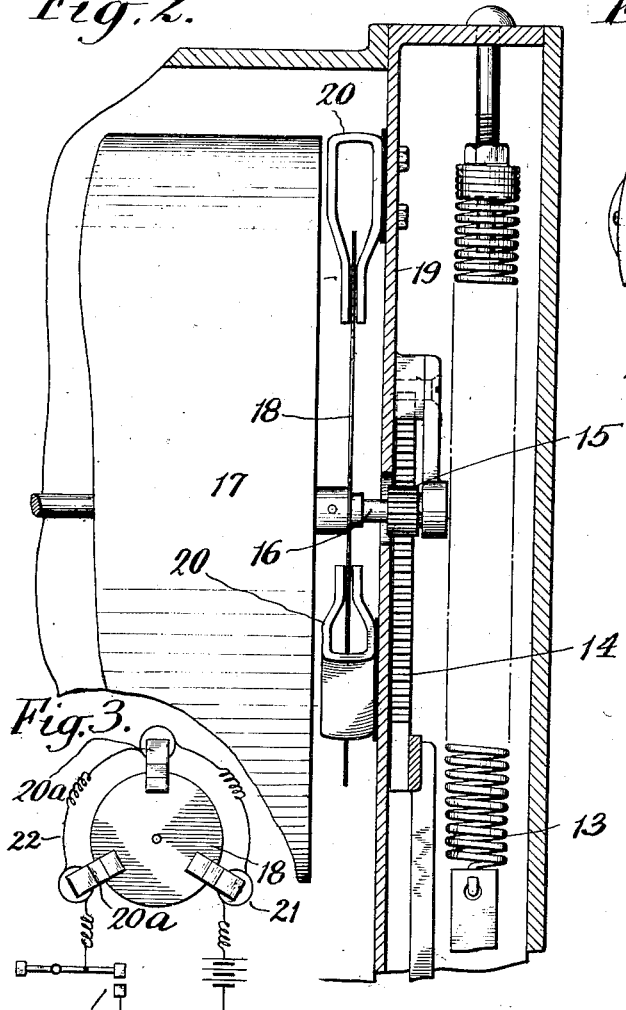
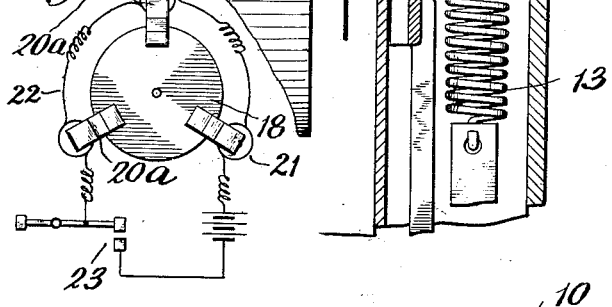
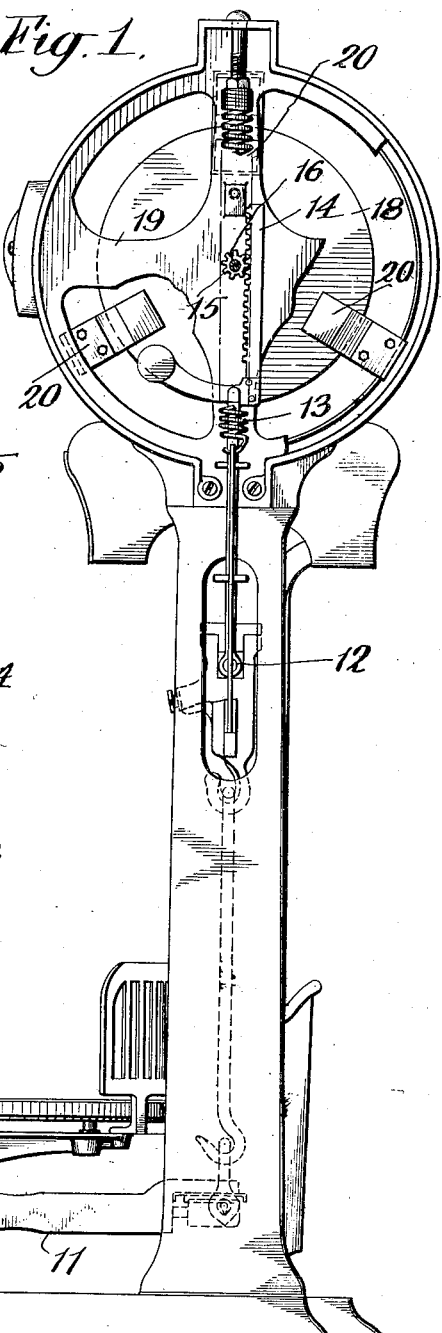
Inventor
Robert Craig
By his Attorney
Kerr Page Cooper & Hayward Patented Nov. 24, 1925.

1,563,019

UNITED STATES PATENT OFFICE.

ROBERT CRAIG, OF DAYTON, OHIO, ASSIGNOR, BY MESNE ASSIGNMENTS, TO DAYTON SCALE COMPANY, OF DAYTON, OHIO, A CORPORATION OF NEW JERSEY.

DAMPING DEVICE FOR SCALES.

Application filed February 19, 1921. Serial No. 446,390.

*To all whom it may concern:*

Be it known that I, ROBERT CRAIG, a citizen of the United States of America, residing at Dayton, in the county of Montgomery and State of Ohio, have invented certain new and useful Improvements in Damping Devices for Scales, of which the following is a full, clear, and exact description.

In the use of weighing scales particularly in those of the so-called automatic type it has been the general practice to utilize dash pots to check the oscillations of the moving parts. These dash pots, while generally satisfactory for this purpose, are subject to certain limitations and possess a number of inherent disadvantages. The dash pots for proper action must be connected to parts having little angular motion and also to parts having comparatively little total travel. Furthermore the contained liquid is liable to become spilled out and lost or to change in consistency under varying climatic conditions.

The present invention has for its object the provision of a vibration retarder which may be entirely independent and disconnected from the moving parts of the scale. The device is of such character that it may be associated with moving parts which have a maximum of angular motion. The present vibration retarder is particularly adapted for association with a rotary weight indicator which is angularly displaced to varying extents in accordance with the applied load.

Other objects of the present invention reside in the provision of a vibration retarder which is simple, inexpensive to manufacture and adjust and which will not be subject to the defects inherent in damping devices of the dash pot type.

In the drawings—

Fig. 1 shows an end view of a weighing scale having my improved device applied thereto.

Fig. 2 shows a detail view of certain of the parts shown in Fig. 1.

Fig. 3 shows a diagrammatic view of a modification in which electromagnets are used in place of the permanent magnets.

The scale to which my invention may be applied may be any one of numerous types now in use. I have here illustrated the invention as employed upon a drum type of counter scale of the automatic computing type but it is to be understood that improved vibration retarder may be employed on other types of automatic scales which employ a pivotal weight indicator.

The scale herein shown comprises a load support or platform 10, a base lever 11 connected through steelyard to an equalizer bar 12 and therethrough to the load counterbalancing springs 13. The equalizer is likewise connected to the racks 14 which enmesh with a pinion 15 upon a shaft 16 carrying the indicating drum 17. These features are all well known in scales of this type and further description is unnecessary.

*Vibration retarder.*

Upon shaft 16 and preferably intermediate the pinion and the indicator, I provide a thin disc 18. This disc is preferably made of aluminum so as to be as light as possible and is rigidly secured to a collar which is fast upon the shaft.

Upon a suitable supporting frame such as the end housing 19 of the drum I provide a number of magnets 20. These magnets have their poles spaced closely to but not in contact with the surface of the disc 18 as best shown in Fig. 2. The magnets are preferably three in number and are preferably located 120° apart as shown in Fig. 1. Suitable adjustments may be provided for adjusting the position of the magnets relatively to the disc.

The operation of the device is as follows:—When a load is applied to the platform the drum indicator is turned in the usual manner and usually this indicator oscillates to and fro before coming to a final position of rest. The oscillatory motion of the disc 18 past the magnet poles causes eddy currents to be set up in the disc therein, thus exerting a damping torque and rapidly bringing the disc and its associated indicator to rest. By utilizing the disc for this purpose and mounting the same upon the indicator shaft I obtain a maximum damping action since the motion is greatest upon the parts which move in unison with the indicator.

The vibration retarder here described is particularly valuable in connection with the drum type of computing scale where the inertia effect of the drum tends to magnify and to maintain the oscillations. The magnets are entirely clear and out of frictional contact with the moving parts thereby reducing the amount of friction materially over that of a piston moving in a dash pot. The damping action is at a minimum just before the parts come to a position of rest. This minimum damping action is not in any way magnified by the sliding friction of parts and therefore scales equipped with the improved damping device are more sensitive than heretofore.

I also contemplate the use of electromagnets such as shown at 20ª in Fig. 3. These magnets are provided with windings 21 connected in series by means of a wire 22 which leads to a suitable source of current and through a pair of contacts 23. These contacts may be arranged to close upon the application of a load to the scale and to open upon the removal of the load. Contact devices of this sort for closing the circuit to a chart illuminating device are well known in the art and for a detailed description therefore reference may be had to the Bane and Crane Patent No. 937,573.

The operation of the damping devices in which electromagnets are used is the same as before except that the magnets are energized by the current when the load is upon the scale platform.

What I claim is:—

In a weighing scale, in combination, a platform, a scale lever, automatic load counterbalancing means connected thereto, an indicator connected thereto, an element oscillating in unison with the indicator, magnet means having poles in proximity to said element to set up eddy currents therein and damp the oscillations of the indicator upon relative movement of the element and said magnet means, windings upon said magnets, a circuit including said windings, and means operable upon the application of a load to the scale for closing said circuit and permitting the current to flow through said windings.

In testimony whereof I hereto affix my signature.

ROBERT CRAIG.